(12) United States Patent
Muraji et al.

(10) Patent No.: US 9,075,427 B2
(45) Date of Patent: Jul. 7, 2015

(54) ACCELERATOR PEDAL APPARATUS

(75) Inventors: Tetsuo Muraji, Odawara (JP); Yoshitomo Fukushima, Odawara (JP)

(73) Assignee: MIKUNI CORPORATION, Tokyo (JP)

( * ) Notice: Subject to any disclaimer, the term of this patent is extended or adjusted under 35 U.S.C. 154(b) by 948 days.

(21) Appl. No.: 12/801,024

(22) Filed: May 17, 2010

(65) Prior Publication Data

US 2010/0294074 A1  Nov. 25, 2010

(30) Foreign Application Priority Data

May 20, 2009  (JP) .................................. 2009-121491

(51) Int. Cl.
*G05G 5/03* (2008.04)
*G05G 1/30* (2008.04)
*B60K 26/02* (2006.01)

(52) U.S. Cl.
CPC .............. *G05G 1/30* (2013.01); *Y10T 74/20534* (2015.01); *B60K 26/021* (2013.01); *G05G 5/03* (2013.01)

(58) Field of Classification Search
CPC ........... G05G 1/38; G05G 1/445; G05G 1/44; G05G 1/30; G05G 5/03; B60K 26/021; B60K 26/022; B60K 26/023; B60K 26/026; H01H 21/28
USPC ............ 74/512–514, 560; 267/248–253, 255, 267/266, 169, 174, 157, 177, 170; 200/86.5, 61.89
See application file for complete search history.

(56) References Cited

U.S. PATENT DOCUMENTS

| | | | | |
|---|---|---|---|---|
| 5,115,186 A | * | 5/1992 | Reinartz et al. | 74/513 |
| 6,591,712 B2 | * | 7/2003 | Goto et al. | 74/514 |
| 6,745,642 B2 | * | 6/2004 | Kumamoto et al. | 74/512 |
| 6,758,114 B2 | * | 7/2004 | Sundaresan et al. | 74/512 |
| 6,758,129 B2 | * | 7/2004 | Dreischarf et al. | 180/271 |
| 8,266,982 B2 | * | 9/2012 | Peniston et al. | 74/513 |
| 2004/0011155 A1 | * | 1/2004 | Kumamoto et al. | 74/513 |

(Continued)

FOREIGN PATENT DOCUMENTS

DE  102004025829 A1 * 12/2005
EP  1975760 A2 * 10/2008

(Continued)

OTHER PUBLICATIONS

JP,2007-137152,A. Japan Patent Office: AIPN. http://dossier1.ipdl.inpit.go.jp/AIPN/odse_call_transl.ipdl?N0000=7413&N0005=Ei7BzenZVnBvfz7D1ZIK&N0120=01&N2001=2&N3001=2007-137152&Ntt3=autoV14&Ntt4=logisticsV14&Ntt5=machineV14&Ntt6=&Ntt7=&Ntt8=&Ntt9=&Ntt10=&Ntt11=&Ntt12=.*

*Primary Examiner* — Daniel Yabut

(57) ABSTRACT

An accelerator pedal apparatus includes a pedal arm having an accelerator pedal, a housing rotatably supporting the pedal arm between a rest position and a maximum depression position, a first return spring exerting urging force to return the pedal arm toward the rest position, a reaction force adding mechanism adding reaction force opposed to tread force of the accelerator pedal; and the reaction force adding mechanism includes a movable member arranged movably against the housing while receiving reaction force of the first return spring, a reaction force spring arranged between the movable member and the pedal arm as being capable of generating reaction force against the tread force, and a lock mechanism being capable of locking the movable member not to be movable at desired timing, so that fuel consumption can be improved by exerting resistance force to driver's depressing operation to suppress excessive depression.

3 Claims, 9 Drawing Sheets

(56) References Cited

U.S. PATENT DOCUMENTS

2004/0259687 A1* 12/2004 Ritter et al. .................. 477/187
2006/0230875 A1* 10/2006 Ouyang .......................... 74/560
2007/0240534 A1* 10/2007 Makino .......................... 74/513
2008/0134830 A1*  6/2008 Park .............................. 74/514

FOREIGN PATENT DOCUMENTS

| JP | 05008667 A * | 1/1993 |
| JP | 2004-155375 | 6/2004 |
| JP | 2007-137152 | 6/2007 |
| WO | WO 2005084991 A1 * | 9/2005 |

* cited by examiner

FIG. 6A
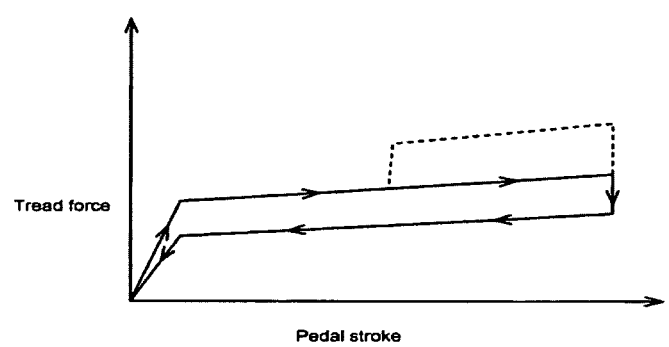
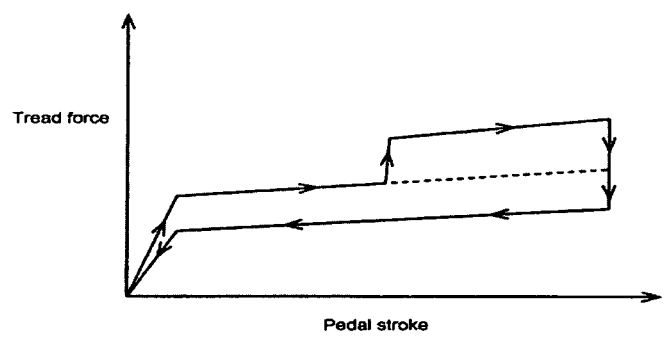
FIG. 6B

ACCELERATOR PEDAL APPARATUS

CROSS-REFERENCE TO RELATED APPLICATIONS

This application claims the benefit of Japanese Patent Application No. 2009-121491, filed on May 20, 2009 in the Japanese Patent Office, the disclosure of which is incorporated herein by reference.

BACKGROUND

1. Field

The present invention relates to an accelerator pedal apparatus applied to vehicles and the like having a drive-by-wire system, and in particular, relates to an accelerator pedal apparatus including a mechanism to generate reaction force (i.e., resistance force) opposed to tread force of an accelerator pedal in order to suppress excessive depression for improving fuel consumption and the like.

2. Description of the Related Art

For an engine mounted on an automobile and the like, an accelerator pedal apparatus applied to an electronically controlled throttle system (i.e., a drive-by-wire system) includes a pedal arm swingably supported to a housing, a return spring to return the pedal arm to a rest position, a hysteresis generating mechanism to generate hysteresis on pedal load (i.e., tread force), a position sensor to detect an angular position of the pedal arm and the like, so that a depression amount (i.e., an angular position) of a accelerator pedal (i.e., the pedal arm) is detected by the position sensor and engine output control is performed based on the detection signal as disclosed in Japanese Patent Publication No. 2004-155375.

Another accelerator pedal apparatus includes a reaction force adding mechanism as accelerator restriction means to restrict depression of an acceleration pedal by generating resistance force on tread force of the accelerator pedal as disclosed in Japanese Patent Publication No. 2007-137152. The reaction force adding mechanism includes a pedal arm swingably supported to a housing (i.e., a casing bracket), a support shaft swingably supporting the pedal arm, a coil-shaped return spring to return the pedal arm toward a rest position, a rod arranged to pass through the return spring and being capable of contacting to an upper end part of the pedal arm, a slider holding a rod and a second spring which urges the rod toward the pedal arm side, a lead screw rotatably supported to the housing for driving the slider to reciprocate and provided integrally with a gear, a motor fixed to the housing for rotationally driving a worm gear mated with the gear of the lead screw, and the like.

Here, the reaction force adding mechanism adopts a transmission path of driving force (i.e., pressing back force) from the worm gear to the slider and rod via the gear and lead screw. Therefore, the configuration becomes complicated and the apparatus becomes large. In addition, the responsibility is insufficient to be accepted.

When the reaction force adding mechanism disclosed in Japanese Patent Publication No. 2004-155375 is to be applied to the accelerator pedal apparatus disclosed in Japanese Patent Publication No. 2007-137152, the configuration becomes further complicated to be adopted and is difficult to be applied as-is, since the accelerator pedal apparatus is provided with the hysteresis generating mechanism. In addition, in the case that both of the hysteresis generating mechanism and the reaction force adding mechanism are provided, it is necessary to ensure independency of respective functions so as not to affect to one mechanism from the other.

Accordingly, it has been desired to develop an accelerator pedal apparatus of quick response with a simple and downsized configuration while a hysteresis generating mechanism and a reaction force adding mechanism reliably function respectively. In particular, the accelerator pedal apparatus is desired to include a reaction force adding mechanism to add reaction force opposed to tread force in order to suppress excessive depression for improving fuel consumption and the like.

SUMMARY

To address the above issues, it is an aspect of the present invention to provide an accelerator pedal apparatus of quick response including a reaction force adding mechanism opposed to tread force to suppress excessive depression for improving fuel consumption and the like while achieving structural simplification, part number reduction, cost reduction, downsizing of the entire apparatus, and the like. In addition, it is an aspect of the present invention to provide an accelerator pedal apparatus satisfying both of the reaction force adding mechanism and a hysteresis generating mechanism to generate hysteresis on tread force.

Additional aspects will be set forth in part in the description which follows and, in part, will be apparent from the description, or may be learned by practice of the invention.

According to an aspect of the present invention, an accelerator pedal apparatus includes a pedal arm which includes an accelerator pedal, a housing which supports the pedal arm between a rest position and a maximum depression position as being rotatable around a predetermined swing axis line, a first return spring which exerts urging force to the pedal arm to return toward the rest position, and a reaction force adding mechanism which adds reaction force opposed to tread force of the accelerator pedal; and the reaction force adding mechanism includes a movable member movably arranged against the housing while receiving reaction force of the first return spring, a reaction force spring arranged between the movable member and the pedal arm to be capable of generating reaction force against the tread force, and a lock mechanism being capable of locking the movable member not to be movable at desired timing.

With this configuration, when a driver depresses the accelerator pedal from the rest position toward the maximum depression position, the movable member is moved due to the urging force of the reaction force spring increased by the rotation of the pedal arm and the tread force is increased due to the urging force of the first return spring increased by the movement of the movable member. Meanwhile, when the driver returns the accelerator pedal from the maximum depression position toward the rest position, the pedal arm is returned to the rest position due to the urging force of the first return spring and the reaction force spring with decrease of the tread force.

Here, when the driver depresses the accelerator pedal, the lock mechanism is operated and the movable member is locked not to be movable at desired timing (i.e., based on a detection signal indicating that the driver is in a state of depressing the accelerator pedal) in a case that excessive acceleration energy due to excessive depression is preferred to be saved, for example. Accordingly, since only the reaction force spring is deformed, the spring constant becomes large and the reaction force is increased compared to the case that the two serially connected springs (i.e., the first return spring and the reaction force spring) are actuated. With this configuration, since the resistance force (i.e., the reaction force) is increased against the tread force of the driver, excessive depression can be suppressed and fuel consumption can be improved by preventing rapid acceleration.

In the above configuration, the lock mechanism may include a lock member capable of forming a locked state of the movable member with pressing by rotating in one direction and releasing the locked state by rotating in the other direction as following movement of the movable member due to return force of the first return spring, and a drive source rotationally driving the lock member in the one direction.

With this configuration, in the case that the movable member is to be locked when a driver depresses the accelerator pedal, the lock member is rotated in one direction by activating the drive source and the lock member presses and puts the moving member into a locked state. Meanwhile, when the driver eases up on the accelerator pedal, the movable member is moved to the return side by the urging force of the first return spring. The lock member releases the locked state by rotating in the other direction as following to the movement of the movable member.

Here, since the lock mechanism is constituted with the lock member and the drive source and functions as a one-way lock (i.e., a sprag) which locks the movable member only when rotating in one direction, the actuator capable of exerting the rotational drive force only in one direction can be adopted as the drive source as well. Accordingly, it is possible to achieve electric power saving and downsizing of the drive source, eliminating of an electronic control unit (ECU), reducing cost, or the like.

In the above configuration, the accelerator pedal apparatus may further include a hysteresis generating mechanism which generates hysteresis on tread force of the accelerator pedal and may be configured as follows. The movable member is constituted with a slider formed to be cylindrical having an inner wall face and arranged slidably in a predetermined direction against the housing. The first return spring and the reaction force spring are constituted respectively with a compression spring to be stretched and compressed in a predetermined direction. The reaction force spring is arranged at the inside of the slider. The hysteresis generating mechanism includes an inner slider slidably arranged within the slider and between the pedal arm and the reaction force spring having sliding resistance force increased in accordance with increase of the tread force.

With this configuration, when a driver depresses the accelerator pedal from the rest position toward the maximum depression position, the slider is moved as the reaction force spring being compressed via the inner slider and the tread force is increased due to the compression of the first return spring by the movement of the slider. Meanwhile, when the driver returns the accelerator pedal from the maximum repression position toward the rest position, the pedal arm is returned to the rest position due to the urging force of the first return spring and the reaction force spring via the inner slider with decrease of the tread force.

Here, when the accelerator pedal is depressed, the inner slider is relatively moved within the slider with increase of the sliding resistance since the inner slider is pressed by the pedal arm against the reaction force spring. Meanwhile, when the accelerator pedal is returned, the inner slider is relatively moved within the slider while decreasing the slide resistance. In this manner, the hysteresis on the tread force of being large when depressing and being small when returning can be generated, so that the desired hysteresis characteristics of the tread force can be obtained. In addition, since the reaction force spring of the reaction force adding mechanism also serves as the reaction force spring to exert reaction force to the inner slider of the hysteresis generating mechanism, both of the reaction force adding mechanism and the hysteresis generating mechanism are satisfied while achieving structural simplification, downsizing of the apparatus, and the like.

In the above configuration, the accelerator pedal apparatus may further include a second return spring which exerts urging force to the pedal arm as being directly engaged therewith so as to return the pedal arm toward the rest position, and the pedal arm may be engaged with the inner slider as being possible to be disengaged therefrom.

With this configuration, the pedal arm is possible to be disengaged from the inner slider. Accordingly, even in a case that an operational malfunction of being unable to release from the locked state occurs, the pedal arm can be reliably returned to the rest position by the urging force of the second return spring and safety can be ensured.

In the above configuration, the movable member may be constituted with a rotor arranged rotatably around a swing axis line of the pedal arm; and the first return spring and the reaction force spring may be constituted respectively with a torsion spring arranged around the swing axis line.

With this configuration, when a driver depresses the accelerator pedal from the rest position toward the maximum depressing position, the rotor is rotated as the reaction force spring being twisted and the tread force is increased due to the twisting of the first return spring by the rotation of the rotor. Meanwhile, when the driver returns the accelerator pedal from the maximum depression position toward the rest position, the pedal arm is returned to the rest position due to the urging force of the first return spring and the reaction force spring with decrease of the tread force.

In this manner, since the rotor rotating around the swing axis line of the pedal arm is adopted as the movable member and the torsion springs are arranged around the swing axis line as the first return spring and the reaction force spring, various parts can be aggregated at the vicinity of the swing axis line and the apparatus can be downsized.

The accelerator pedal apparatus configured as described above includes a reaction force adding mechanism opposed to the tread force to suppress excessive depression for improving fuel consumption and the like while achieving structural simplification, part number reduction, cost reduction, downsizing of the entire apparatus, and the like. In addition, both of the reaction force adding mechanism and a hysteresis generating mechanism to generate hysteresis on the tread force can be satisfied and the accelerator pedal apparatus having quick response can be obtained.

BRIEF DESCRIPTION OF THE DRAWINGS

These and/or other aspects will become apparent and more readily appreciated from the following description of the embodiments, taken in conjunction with the accompanying drawings of which:

FIGS. 6A and 6B are graphs which indicate tread force characteristics of the accelerator pedal apparatus of FIG. 1;

DETAILED DESCRIPTION OF THE EMBODIMENTS

Figure 1:
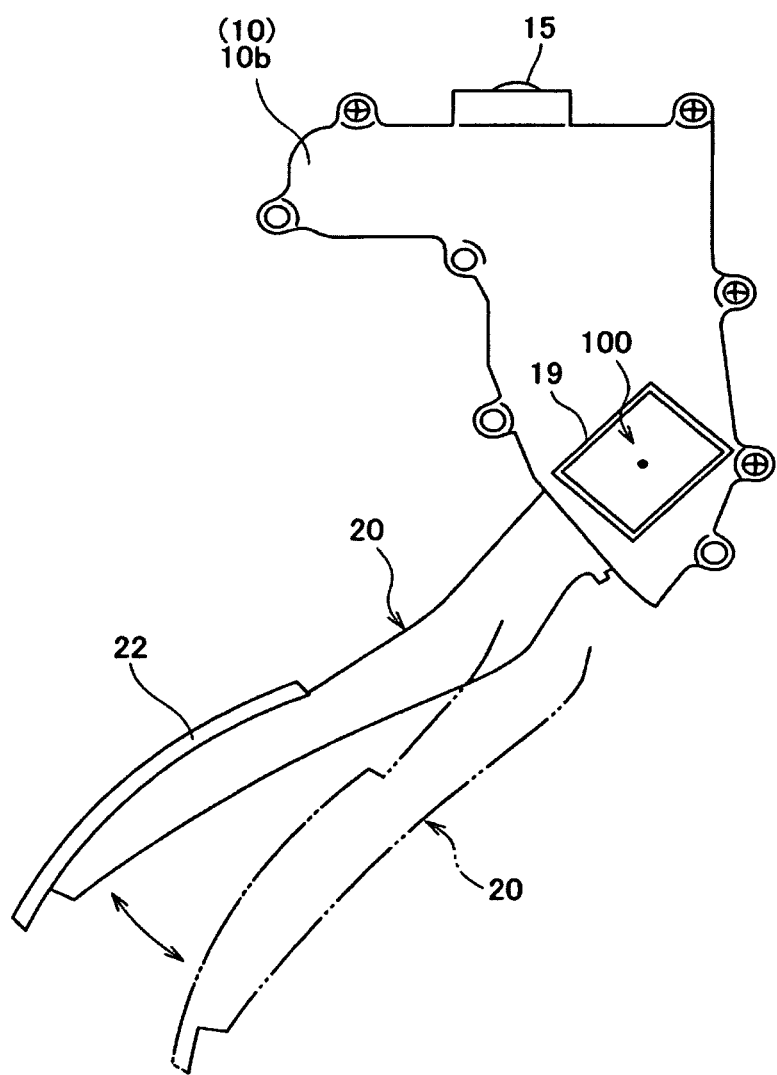
FIG. 1 is a side view which illustrates an accelerator pedal apparatus of an embodiment according to the present invention.

Reference will now be made in detail to the embodiments, examples of which are illustrated in the accompanying drawings, wherein like reference numerals refer to like elements throughout.

As illustrated in FIG. 1, the accelerator pedal apparatus includes a housing 10 fixed to a vehicle body of an automobile and the like, a pedal arm 20 supported swingably to the housing 10 while having an accelerator pedal 22, a first return spring 30 exerting urging force to the pedal arm 20 toward a rest position, a slider 40 as a movable member arranged slidably in a predetermined direction against the housing 10 while being contacted to the first return spring 30, a reaction force spring 50 arranged within the slider 40 being free to be compressed, inner sliders 61, 62 located between the reaction force spring 50 and the pedal arm 20 (i.e., at an upper end portion 23 thereof), a lock member 70 capable of locking the slider 40 by pressing not to be movable, an actuator 80 as a drive source to rotationally drive the lock member 70, a second return spring 90 which exerts urging force to return the pedal arm 20 toward the rest position, a position sensor 100 which detects a rotational angular position of the pedal arm 20, and the like.

Here, the lock member 70 and the actuator 80 constitute a locking mechanism capable of locking the slider 40 not to be movable at desired timing.

Further, the slider 40, the reaction force spring 50 and the locking mechanism (i.e., the lock member 70 and the actuator 80) constitute a reaction force adding mechanism to add reaction force opposed to tread force of the accelerator pedal 22.

Furthermore, the reaction force spring 50 and the inner sliders 61, 62 arranged at the inside of the slider 40 constitute a hysteresis generating mechanism to generate hysteresis on the tread force of the accelerator pedal 22.

Figure 2:
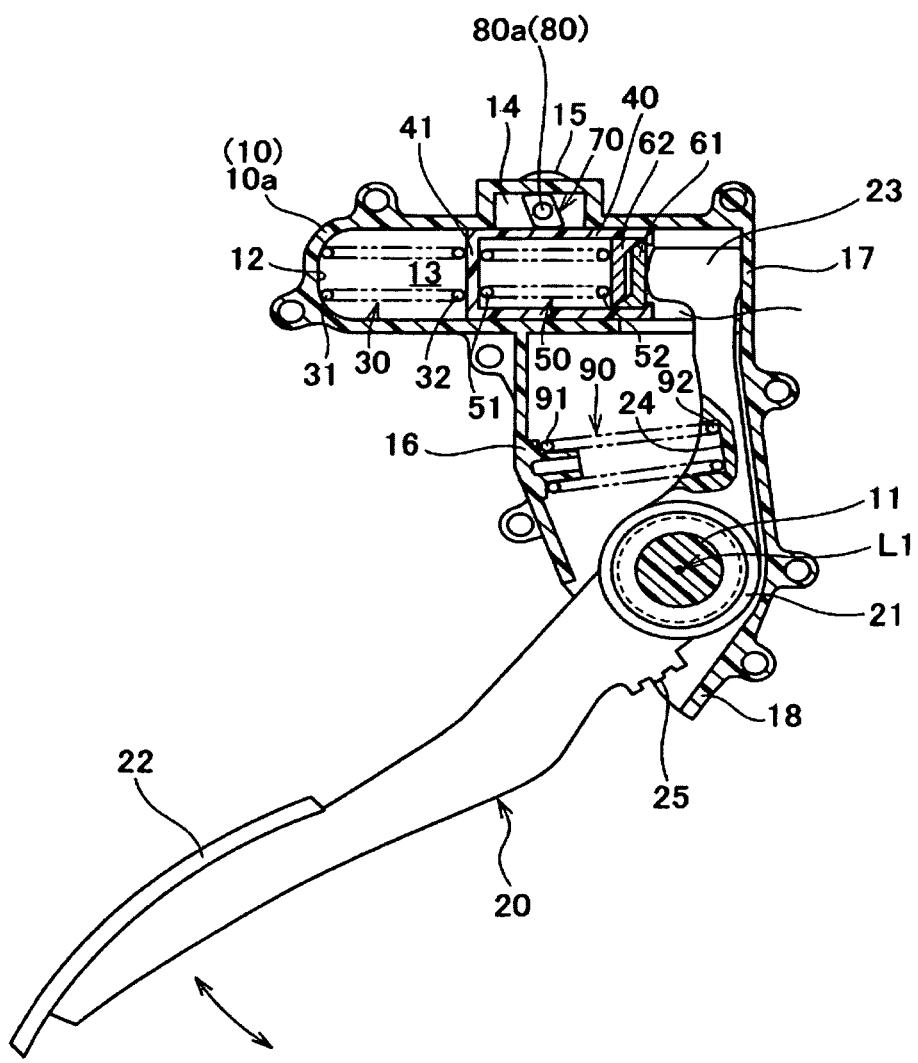
FIG. 2 is a side view which illustrates the inside of the accelerator pedal apparatus of FIG. 1.

The housing 10 is formed of resin material. As illustrated in FIGS. 1 and 2, the housing 10 is constituted with a housing main body 10a and a housing cover 10b which are mutually united.

As illustrated in FIG. 2, the housing main body 10a includes a support shaft 11 supporting the pedal arm 20 swingably around a swing axis line L1, a receiving portion 12 receiving one end part 31 of the first return spring 30, a concave portion 13 having the slider 40 slidably arranged, a concave portion 14 rotatably accommodating the lock member 70, a fixing portion 15 accommodating and fixing the actuator 80, a receiving portion 16 which receives one end part 91 of the second return spring 90, and a rest stopper 17 and a full-open stopper 18 which stop the pedal arm 20 respectively at the rest position and a maximum depression position (i.e., the full-open position).

As illustrated in FIG. 1, the housing cover 10b includes a sensor accommodating portion 19 to accommodate the position sensor 100. The housing cover 10b is formed to cover the whole except for a lower section of the pedal arm 20 in a state that the housing main body 10a mounts the pedal arm 20, the first return spring 30, the slider 40, the reaction force spring 50, the inner sliders 61, 62, the lock member 70, the second return spring 90 and the like.

The pedal arm 20 is formed of resin material as a whole. As illustrated in FIG. 2, the pedal arm 20 is constituted with a cylindrical portion 21 being supported swingably around the swing axis line L1 by the support shaft 11 of the housing main body 10a, the accelerator pedal 22 integrally formed as extending downward from the cylindrical portion 21, an upper end portion 23 integrally formed as extending upward from the cylindrical portion 21, a receiving portion 24 receiving the other end part 92 of the second return spring 90 while being formed at an section between the cylindrical portion 21 and the upper end portion 23, and a contact portion 25 formed at the vicinity below the cylinder portion 21.

Figure 3:
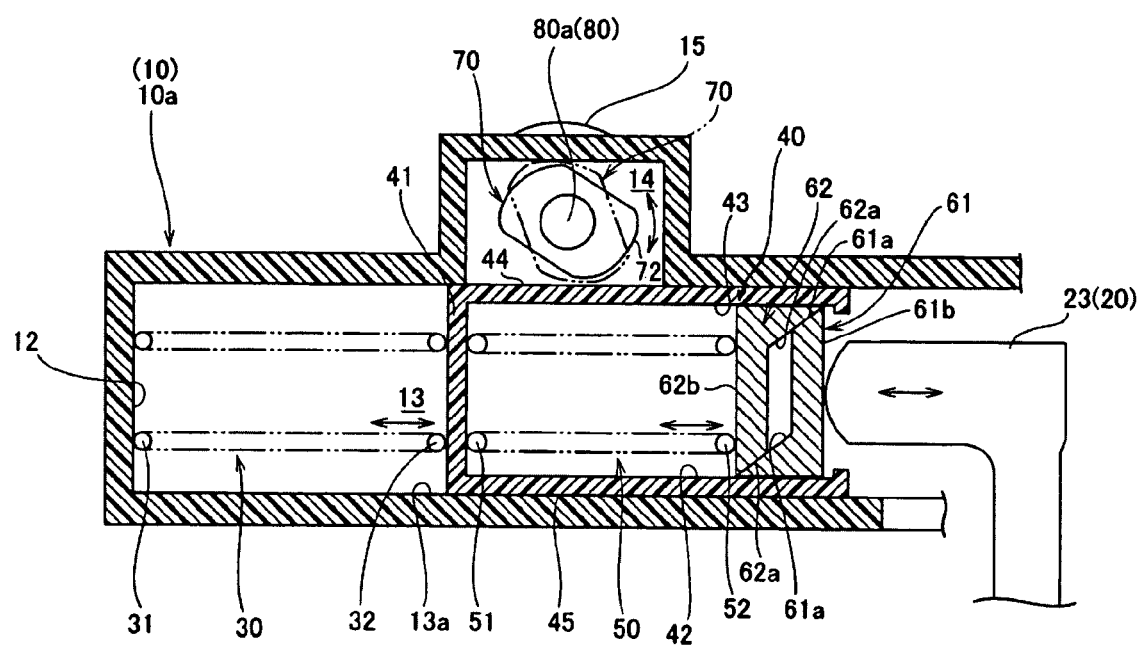
FIG. 3 is a partial view which illustrates a part of the accelerator pedal apparatus of FIG. 1.

The first return spring 30 is a coil-shaped stretchable spring of a compression type formed of spring steel and the like. As illustrated in FIGS. 2 and 3, the first return spring 30 is arranged stretchably in a predetermined direction in a state of being compressed to have a predetermined compression amount as the one end part 31 thereof being engaged with the receiving portion 12 of the housing main body 10a and the other end part 32 being engaged with an end face wall 41 of the slider 40. Accordingly, the first return spring 30 exerts urging force to the pedal arm 20 to return toward the rest position.

As illustrated in FIGS. 2 and 3, the slider 40 is arranged in the concave portion 13 of the housing 10 being slidable in a predetermined direction. The slider 40 is formed to be cylindrical having one end side opened so as to accommodate the reaction force spring 50 at the inside thereof being possible to be compressed and to accommodate the inner sliders 61, 62 being slidable. The slider 40 includes the end face wall 41 which receives one end part 51 of the reaction force spring 50 at the inner side thereof and receives the other end part 32 of the first return spring 30 at the outer side thereof, inner wall faces 42, 43 on which the inner sliders 61, 62 slide, an outer wall face 44 having the lock member 70 contacted, and an outer wall face 45 pressed to a slide face 13a which is defined by the concave portion 13.

The reaction force spring 50 is a coil-shaped stretchable spring of a compression type formed of spring steel and the like. As illustrated in FIGS. 2 and 3, the reaction force spring 50 is arranged stretchably in a predetermined direction (i.e., the same direction as the stretching direction of the first return spring 30) in a state of being compressed to have a predetermined compression amount as the one end part 51 thereof being engaged with the end face wall 41 of the slider 40 and the other end part 52 being engaged with the inner slider 62. Accordingly, the reaction force spring 50 exerts urging force to the pedal arm 20 to return toward the rest position.

The inner slider 61 is formed of resin material (for example, high sliding ability material such as impregnated polyacetal). As illustrated in FIG. 3, the inner slider 61 is slidably contacted to the inner wall face 42 at the lower side of the slider 40 and is provided with an inclined face 61a being contacted to an inclined face 62a of the inner slider 62, and an engaging face 61b being capable of engaging with the upper end portion 23 of the pedal arm 20 being possible to be disengaged therefrom.

The inner slider 62 is formed of resin material (for example, high sliding ability material such as impregnated polyacetal). As illustrated in FIG. 3, the inner slider 62 is slidably contacted to the inner wall face 43 at the upper side of the slider 40 and is provided with the inclined face 62a being contacted to an inclined face 61a of the inner slider 61 and a receiving face 62b which receives the other end part of the reaction force spring 50.

The inner sliders 61, 62 are arranged at the inside of the slider 40 and are relatively slidable against the slider 40 while generating a wedge effect by being pressed by the pedal arm 20 (i.e., the upper end portion 23) as being opposed to the urging force of the reaction force spring 50.

When the pedal arm 20 is depressed toward the maximum depression position (i.e., the full-open position) against the urging force of the reaction force spring (and the first return spring 30 and the second return spring 90), the upper end portion 23 presses the inner sliders 61, 62 toward the left in FIG. 3 against the urging force of the reaction force spring 50. Accordingly, friction force (i.e., sliding resistance) caused by the wedge effect of the inclined faces 61a, 62a becomes large and the friction force is linearly increased in accordance with the increase of the urging force of the reaction force spring 50 (and the first return spring 30 and the second return spring 90).

Meanwhile, when the pedal arm 20 is returned toward the rest position in accordance with the urging force of the reaction force spring 50 (and the first return spring 30 and the second return spring 90), the friction force (i.e., the sliding resistance) caused by the wedge effect of the inclined faces 61a, 62a becomes small. Corresponding to the movement of the inner sliders 61, 62 toward the original position to the right in FIG. 3 by the urging force of the reaction force spring 50, the friction force is linearly decreased in accordance with the decrease of the urging force of the reaction force spring 50 (and the first return spring 30 and the second return spring 90).

Here, since the friction force during returning operation is to be smaller than that during depressing operation, it is possible to generate hysteresis of the entire tread force (i.e., the pedal load) between the depressing operation and the returning operation, as illustrated by a solid line in FIG. 6A.

Figure 4:
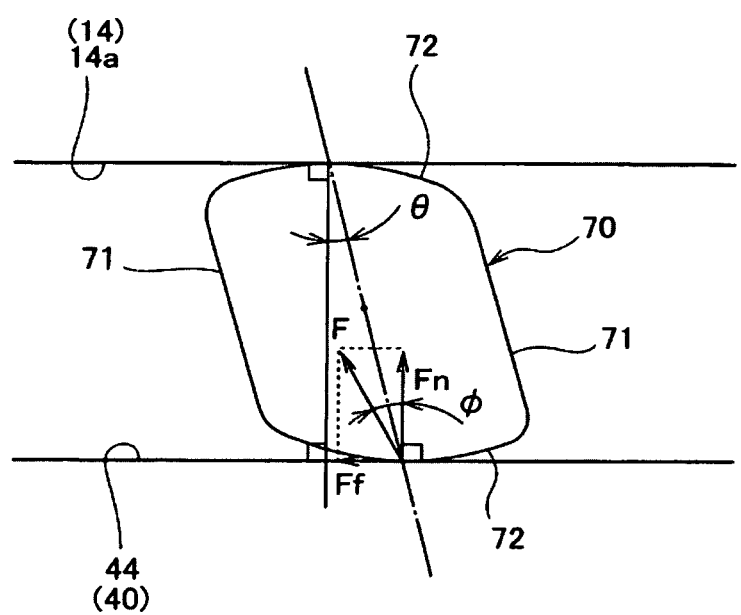
FIG. 4 is a schematic view which illustrates a lock member included in a reaction force adding mechanism being a part of the accelerator pedal apparatus of FIG. 1.

As illustrated in FIGS. 3 and 4, the lock member 70 is formed to define two parallel flat face portions 71 and two curved face portions 72 having predetermined curvature and the center thereof is fixed to a rotational shaft 80a of the actuator 80.

The condition for the lock member 70 to form a locked state is as follows. That is, as illustrated in FIG. 4, the lock member 70 is formed to satisfy the expression of $0 < \theta \le \phi$ (i.e., $0 < \theta \tan^{-1}(F_f/F_n)$) in a state that the curved face portions 72 are contacted to the outer wall face 44 of the slider 40 and the inner wall face portion 14a of the housing main body 10a. Here, $F_n$ denotes normal force, $F_f$ denotes friction force, F denotes resultant force, $\phi$ denotes a friction angle, and $\theta$ denotes a wedge angle.

Then, as illustrated by a two-dot chain line in FIG. 3, the lock member 70 puts the slider 40 into a locked state not to be movable with pressing to the housing 10 (i.e., the slide face 13a) by rotating in one direction (i.e., the clockwise direction). Meanwhile, the lock member 70 releases the locked state by rotating in the other direction (i.e., the counterclockwise direction) as following to movement of the slider 40 due to the return force of the first return spring 30, as illustrated by a solid line in FIG. 3.

The actuator 80 is accommodated in and fixed to the fixing portion 15 of the housing main body 10a and is provided with the rotational shaft 80a to rotatably connect the lock member 70.

The actuator 80 is to exert rotational driving force only in one direction to change the lock member 70 from the lock-released state illustrated by the solid line in FIG. 3 to the locked state illustrated by two-dot chain line.

With above configuration, when a driver depresses the accelerator pedal 22, the lock member 70 is rotated in one direction due to the rotational driving force in one direction of the actuator 80 at desired timing (i.e., based on a detection signal indicating that the driver is in a state of depressing the accelerator pedal 22) in the case that excessive acceleration energy due to excessive depression is preferred to be saved, for example. Accordingly, the curved face portion 72 presses the slider 40 to the inner wall face 13a of the housing main body 10a and locks the slider 40 not to be movable.

At the time of depressing thereafter, only the reaction force spring 50 is compressed out of the serially arranged two springs (i.e., the first return spring 30 and the reaction force spring 50). Therefore, the spring constant becomes large compared to the case that the two springs (i.e., the first return spring 30 and the reaction force spring 50) are actuated. Accordingly, the reaction force (i.e., the tread force) is increased as illustrated by the solid line in FIG. 6B.

For example, the resultant spring constant of the reaction force spring 50 and the first return spring 30 which are serially arranged is expressed by $(k1 \cdot k2)/(k1+k2)$, where k1 denotes the spring constant of the reaction force spring 50 and k2 denotes the spring constant of the first return spring 30. Here, the relation of $k1 > (k1 \cdot k2)/(k1+k2)$ is satisfied. Accordingly, in the case that only the reaction force spring 50 exerts the urging force, the spring constant can be enlarged and the tread force can be increased compared to the case that both of the reaction force spring 50 and the first return spring 30 exert the urging force.

In this manner, by locking the slider 40 at desired timing, the reaction force opposed to the tread force of the accelerator pedal 22 can be added. Accordingly, excessive depression by a driver can be suppressed and fuel consumption can be improved by preventing rapid acceleration.

As described above, the locking mechanism to lock the slider 40 not to be movable is constituted with the lock member 70 and the actuator 80 as the drive source to function as an one-way lock (i.e., a sprag) which locks the slider 40 only when rotating in one direction. Therefore, the actuator 80 capable of exerting the rotational drive force only in one direction can be adopted as the drive source as well. Accordingly, it is possible to achieve electric power saving and downsizing of the drive source, eliminating of an electronic control unit (ECU), reducing of cost, and the like.

The second return spring 90 is a coil spring of a compressed type formed of spring steel and the like. As illustrated in FIG. 2, the second return spring 90 is arranged stretchably in a state of being compressed to have a predetermined compression amount as the one end part 91 being engaged with the receiving portion 16 of the housing main body 10a and the other end part 92 being engaged with the receiving portion 24 of the pedal arm 20. Accordingly, the second return spring 90 exerts urging force to the pedal arm 20 to return toward the rest position.

In this manner, since the second return spring 90 is arranged so as to exert the urging force to the pedal arm 20 to return toward the rest position by directly engaging with the pedal arm 20 in a state that the upper end portion 23 of the pedal arm 20 is engaged with the inner slider 61 being possible to be disengaged therefrom. Accordingly, even in a case that an operational malfunction occurs, for example, being unable to release the locked state of the slider 40, stopping of the slider 40 as being stuck to the housing main body 10a, and stopping of the inner sliders 61, 62 as being stuck within the slider 40, the pedal arm 20 is reliably returned to the rest position by the urging force of the second return spring 90 and safety can be ensured.

The position sensor 100 is arranged in the cylindrical portion 21 of the pedal arm 20 and the sensor accommodating portion 19 of the housing cover 10b at the area around the swing axis line L1 of the pedal arm 20, as illustrated in FIG. 1.

The position sensor 100 is a non-contact type magnetic sensor, for example, and is provided with a circular armature made of magnetic material arranged at the area of the cylindrical portion 21 of the pedal arm 20, a pair of arc-shaped permanent magnets connected to an inner circumferential face of the armature, two stators made of magnetic material embedded in the housing cover 10b, and two hall elements arranged between the two stators. A circuit board having terminals and various electronic parts mounted is provided as a part relating thereto.

Then, when the pedal arm 20 is rotated, the position sensor 100 detects variation of magnetic flux density with the hall elements and outputs as a voltage signal. In this manner, the angular position of the pedal arm 20 is detected.

Next, the operation of the accelerator pedal apparatus is described with reference to FIGS. 1, 2, 5A to 5C, 6A and 6B.

First, when the accelerator pedal 22 is at the rest position as not being depressed by a driver, the upper end portion 23 of the pedal arm 20 is contacted to the rest stopper 17 due to the urging force of the first return spring 30, the reaction force spring 50 and the second return spring 90. Accordingly, the pedal arm 20 is stopped at the rest position indicated by the solid line in FIGS. 1 and 2.

Figure 5A:
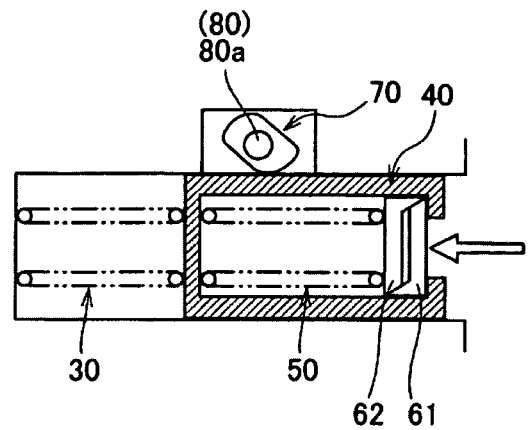
FIGS. 5A to 5C are operational views which illustrate operation of the reaction force adding mechanism and a hysteresis generating mechanism being a part of the accelerator pedal apparatus of FIG. 1.
Figure 5B:
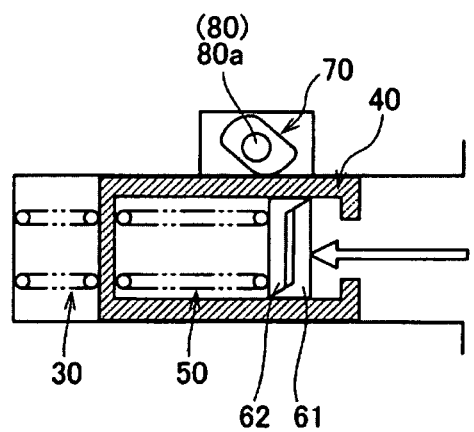

When the driver depresses the accelerator pedal 22 from this state, the pedal arm 20 is rotated counterclockwise in FIG. 2 against the urging force of the first return spring 30, the reaction force spring 50 and the second return spring 90. The pedal arm 20 is rotated to the maximum depression position (i.e., the full-open position) while the inner sliders 61, 62 are moved by a predetermined amount against the reaction force spring 50 and the slider 40 is moved by a predetermined amount against the housing 10 as illustrated in FIGS. 5A and 5B. Then, the pedal arm 20 is stopped as the contact portion 25 thereof being contacted to the full-open stopper 18 of the housing main body 10a.

Meanwhile, when the driver eases up on the tread force, the pedal arm 20 is rotated toward the rest position due to the urging force of the first return spring 30, the reaction force spring 50 and the second return spring 90 while exerting resistance load (i.e., the pedal load) smaller than that at the time of depressing to the driver. Then, the pedal arm 20 is stopped as the upper end portion 23 thereof being contacted to the rest stopper 17 of the housing main body 10a.

Figure 5C:
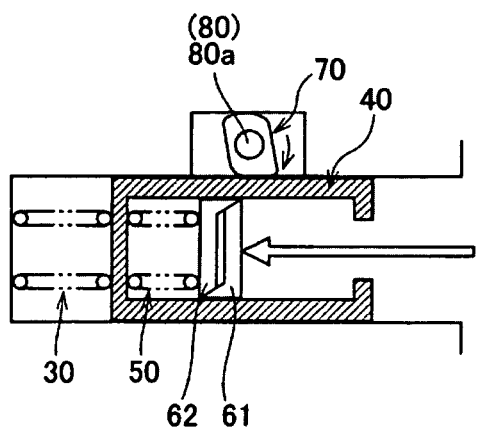

Here, when the driver depresses the accelerator pedal 22, in the case of suppressing the depression in order to save excessive acceleration energy due to excessive depression, for example, the slider 40 is locked not to be movable as being pressed against the housing 10 while the lock member 70 is rotated in the clockwise direction as illustrated in FIG. 5C due to the rotational drive force of the actuator 80 in one direction at desired timing (i.e., based on the detection signal indicating that the driver is in a state of depressing the accelerator pedal 22).

At the operation of depressing thereafter, only the reaction force spring 50 out of the first return spring 30 and the reaction force spring 50 is compressed. Therefore, the spring constant becomes large and the reaction force increases compared to the case that the two serially connected springs (i.e., the first return spring 30 and the reaction force spring 50) are actuated. Accordingly, since the resistance force (i.e., the reaction force) against the tread force of the driver is increased, excessive depression by the driver can be suppressed and fuel consumption can be improved by preventing rapid acceleration.

Meanwhile, when the driver eases up on the tread force, the slider 40 moves in the returning direction due to the urging force of the first return spring 30 and the lock member 70 is rotated counterclockwise following to the movement of the slider 40 and releases the locked state. The pedal arm 20 is rotated toward the rest position due to the urging force of the first return spring 30, the reaction force spring 50 and the second return spring 90 while exerting the resistance load (i.e., the pedal load) smaller than that at the time of depressing to the driver. Then, the pedal arm 20 is stopped as the upper end portion 23 thereof being contacted to the rest stopper 17 of the housing main body 10a.

With the accelerator pedal apparatus according to the present embodiment, both of the reaction force adding mechanism (i.e., the slider 40, the reaction force spring 50, the lock member 70 and the actuator 80) opposed to the tread force to suppress excessive depression of the accelerator pedal 22 for improving fuel consumption and the like and the hysteresis generating mechanism (the inner sliders 61, 62 and the reaction force spring 50) to generate hysteresis on the tread force can be satisfied while achieving structural simplification, part number reduction, cost reduction, downsizing of the entire apparatus, and the like. Accordingly, quick response accelerator operation can be obtained.

In the description of the abovementioned embodiment, the reaction force adding mechanism is adopted to the configuration having the hysteresis generating mechanism. However, not limited to the above, the reaction force adding mechanism may be also adopted to the configuration eliminating the hysteresis generating mechanism.

In this case, a flat-plate-shaped movable spacer may be arranged between the other end part 52 of the reaction force spring 50 and the upper end portion 23 of the pedal arm 20 replacing the inner sliders 61, 62. Instead, the upper end portion 23 may be directly contacted to the other end part 52 of the reaction force spring 50.

In the description of the abovementioned embodiment, the upper end portion 23 of the pedal arm 20 is engaged with the inner slider 61 being possible to be disengaged therefrom and the second return spring 90 is adopted. However, not limited to the above, the reaction force adding mechanism may be adopted to the configuration having the upper end portion 23 connected to the inner slider 61 and eliminating the second return spring 90 as long as the functions of the slider 40 and the inner sliders 61, 62 are ensured.

In the abovementioned embodiment, the configuration including the inner sliders 61, 62 arranged at the inside of the slider 40 are adopted as the hysteresis generating mechanism. However, not limited to the above, another configuration may be adopted.

In the configuration of the abovementioned embodiment, when a driver depresses the accelerator pedal 22 in the lock-released state that the locked state of the slider 40 is released, both of the first return spring 30 and the reaction force spring 50 are deformed to be compressed so that return force is exerted to the pedal arm 20. However, not limited to the above, it is also possible to adopt a reaction force adding mechanism in which the spring constant of the reaction force spring 50 is set to be sufficiently larger than that of the first return spring 30. With this reaction force adding mechanism, when a driver depresses the accelerator pedal 22 during the lock-released state, the first return spring 30 is mainly deformed to be compressed with little compression deformation of the reaction force spring 50 and only the reaction force spring 50 is deformed to be compressed as the compression deformation of the first return spring 30 being restricted in the locked state of the slider 40.

Figure 7:
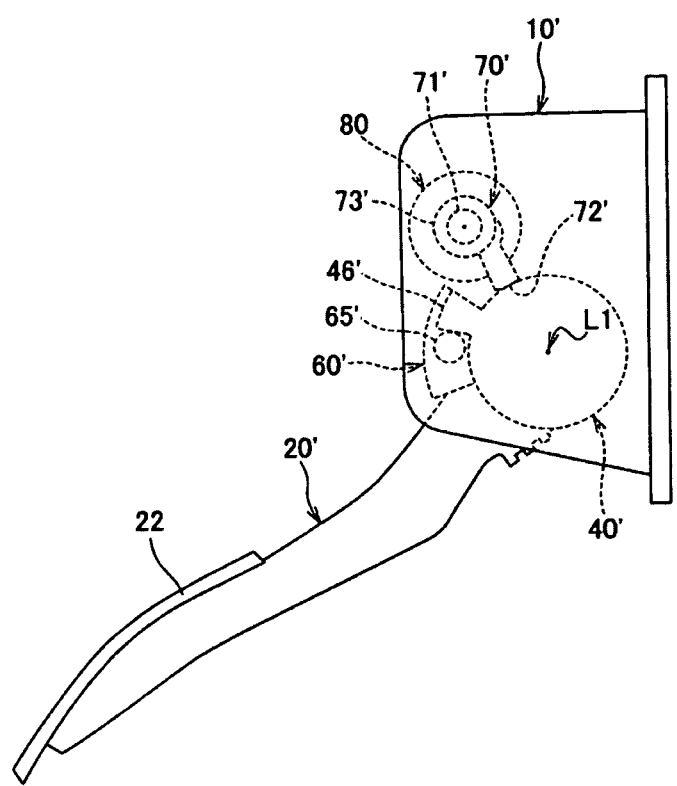
FIG. 7 is a side view of an accelerator pedal apparatus of another embodiment according to the present invention.
Figure 8:
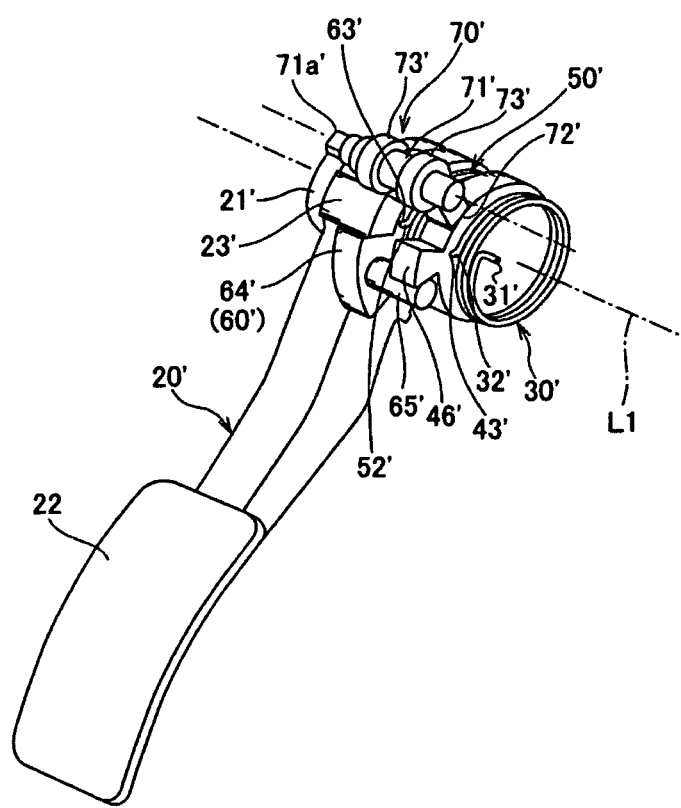
FIG. 8 is a perspective view which illustrates the internal configuration of the accelerator pedal apparatus of FIG. 7.
Figure 9:
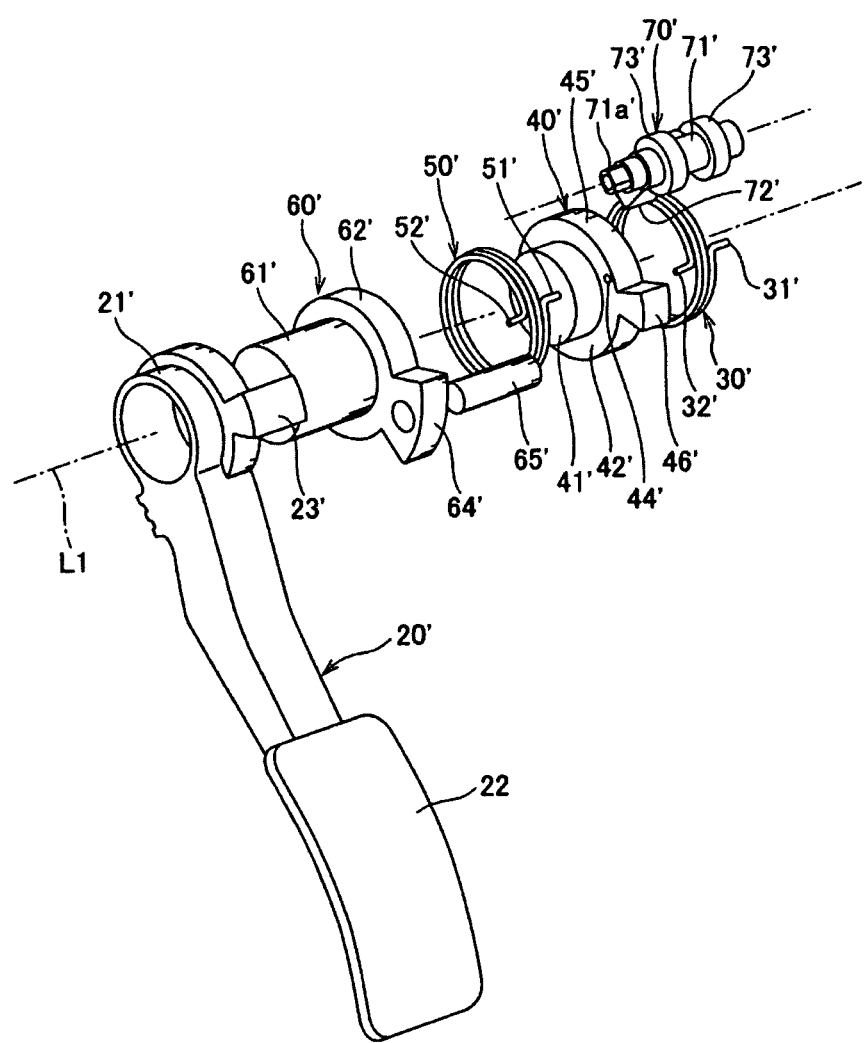
FIG. 9 is a disassembled perspective view which illustrates the internal configuration of the accelerator pedal apparatus of FIG. 7.

FIGS. 7 to 9 illustrate an accelerator pedal apparatus of another embodiment according to the present invention. In this embodiment, a rotor is utilized as a movable member constituting a reaction force adding mechanism.

As illustrated in FIGS. 7 to 9, the accelerator pedal apparatus includes a housing 10' fixed to a vehicle body of an automobile and the like, a pedal arm 20' supported swingably to the housing 10' while having an accelerator pedal 22, a first return spring 30' exerting urging force to return the pedal arm 20' toward a rest position, a first rotor 40' as a movable member arranged rotatably around the swing axis line L1 against the housing 10' while receiving reaction force of the first return spring 30', a reaction force spring 50' arranged around the swing axis line L1 having one end part thereof engaged with the first rotor 40', a second rotor 60' arranged between the reaction force spring 50' and the pedal arm 20' (i.e., at an engaging portion 23') being rotatable around the swing axis line L1, a lock member 70' capable of locking the first rotor 40' by pressing not to be movable, the actuator 80 as a drive source to rotationally drive the lock member 70', a position sensor (not illustrated) detecting a rotational angular position of the pedal arm 20', and the like. As similar to the abovementioned embodiment, a second return spring being directly connected to the pedal arm 20' may be provided so as to exert urging force directly to return the pedal arm 20' toward the rest position.

Here, the lock member 70' and the actuator 80 constitute a locking mechanism capable of locking the first rotor 40' not to be movable (i.e., not to be rotatable) at desired timing.

Further, the first rotor 40', the reaction force spring 50' and the locking mechanism (i.e., the lock member 70' and the actuator 80) constitute a reaction force adding mechanism to add reaction force opposed to tread force of the accelerator pedal 22.

Similar to the abovementioned embodiment, the housing 10' includes a support shaft supporting the pedal arm 20' swingably around the swing axis line L1, an engaging hole to engage with one end part 31' of the first return spring 30', a support portion rotatably supporting the lock member 70', a fixing portion accommodating and fixing the actuator 80, and a rest stopper and a full-open stopper stopping the pedal arm 20' respectively at the rest position and a maximum depression position (i.e., the full-open position).

The pedal arm 20' is formed of resin material as a whole. As illustrated in FIGS. 8 and 9, the pedal arm 20' is constituted with a cylindrical portion 21' being supported swingably around the swing axis line L1 by the support shaft of the housing 10', the accelerator pedal 22 integrally formed as extending downward from the cylindrical portion 21', and the engaging portion 23' engaging with a later-described protruding portion 64' of the second rotor 60' formed to be L-shaped so as to be protruding in the radial direction from the cylindrical portion 21' and extending in the direction of the swing axis line L1.

The first return spring 30' is a torsion spring formed of spring steel and the like. As illustrated in FIGS. 8 and 9, the first return spring 30' is arranged around the swing axis line L1 in a state of exerting predetermined torsional urging force as one end part 31' thereof being engaged with the engaging hole of the housing 10' and the other end part 32' being engaged with an engaging hole 43' of the first rotor 40'. Accordingly, the first return spring 30' exerts urging force to the pedal arm 20' to return toward the rest position.

As illustrated in FIGS. 8 and 9, the first rotor 40' is rotatably arranged around the swing axis line L1 being coaxial to the cylindrical portion 21' of the pedal arm 20'. The first rotor 40' includes a small-diameter column portion 41', a large-diameter column portion 42', the engaging hole 43' engaging the other end part 32' of the first return spring 30' at one side face of the large-diameter column 42', an engaging hole 44' engaging one end part 51' of the reaction force spring 50' at the other side face thereof, an outer circumferential face 45' having the lock member 70' contacted at the large-diameter column portion 42', and a protruding portion 46' protruding in the radial direction from the outer circumferential face 45' having an later-mentioned engaging pin 65' of the second rotor 60' engaged.

The reaction force spring 50' is a torsion spring formed of spring steel and the like. As illustrated in FIGS. 8 and 9, the reaction force spring 50' is arranged around the swing axis line L1 in a state of exerting predetermined torsional urging force as the one end part 51' being engaged with the engaging hole 44' of the first rotor 40' and the other end part 52' being engaged with the engaging hole 63' of the second rotor 60'. Accordingly, the reaction force spring 50' exerts urging force to the pedal arm 20' to return toward the rest position.

As illustrated in FIGS. 8 and 9, the second rotor 60' is rotatably arranged around the swing axis line L1 being coaxial to the cylindrical portion 21' of the pedal arm 20'. The second rotor 60' includes a small-diameter column portion 61', a large-diameter column portion 62', an engaging hole 63' engaging the other end part 52' of the reaction force spring 50' at one side face of the large-diameter column 62', a protruding portion 64' protruding in the radial direction from the large-diameter column portion 62', and an engaging pin 65' extending in the direction of the swing axis line L1 as being connected to the protruding portion 64'.

Here, the mutual relation among the first return spring 30', the first rotor 40', the reaction force spring 50', the second rotor 60' and the pedal arm 20' is as follows. The engaging pin 65' of the second rotor 60' is engaged with the protruding portion 64' of the first rotor 40' being possible to be disengaged therefrom and the protruding portion 64' of the second rotor 60' is engaged with the engaging portion 23' of the pedal arm 20' being possible to be disengaged therefrom. Accordingly, the pedal arm 20' is urged to be returned toward the rest position by the rotational urging force of the first return spring 30' and the reaction force spring 50'. Meanwhile, when the pedal arm 20' is rotated toward the maximum depression position, the return force is increased in the state that the first return spring 30' is mainly deformed with little deformation of the reaction force spring 50'. That is, the spring constant of the reaction force spring 50' is set to be sufficiently larger than that of the first return spring 30', so that the reaction force spring 50' is not deformed to be twisted except for when the first rotor 40' is locked.

As illustrated in FIGS. 7 to 9, the lock member 70' is formed to define a rotational shaft 71' and a curved face portion 72' integrally formed with the rotational shaft 71' having predetermined curvature. The rotational shaft 71' is rotatably supported by the housing 10' via a bearing 73' and one end part 71a' of the rotational shaft 71' is connected to a rotational shaft of the actuator 80.

The condition for the lock member 70' to form a locked state is similar to the condition as the case illustrated in FIG. 4. That is, the lock member 70' is formed to satisfy the expression of $0 < \theta \leq \phi$ (i.e., $0 < \theta \leq \tan^{-1}(F_f/F_n)$) in a state that the curved face portion 72' is contacted to the outer circumferential face 45' of the first rotor 40'. Here, $F_n$ denotes normal force, $F_f$ denotes friction force, $\phi$ denotes a friction angle, and $\theta$ denotes a wedge angle.

With above configuration, when a driver depresses the accelerator pedal 22, the lock member 70' is rotated in one direction due to the rotational driving force in one direction of the actuator 80 at desired timing (i.e., based on a detection signal indicating that the driver is in a state of depressing the accelerator pedal 22) in the case that excessive acceleration energy due to excessive depression is preferred to be saved, for example. Accordingly, the curved face portion 72' presses and locks the first rotor 40' not to be movable.

At the time of depressing thereafter, only the reaction force spring 50' is deformed to be twisted while the twist deformation of the first return spring 30' is restricted out of the serially arranged two springs (i.e., the first return spring 30' and the reaction force spring 50'). Therefore, similar to the abovementioned embodiment, the spring constant becomes large compared to the case that the two springs (i.e., the first return spring 30' and the reaction force spring 50') are actuated. Accordingly, the reaction force (i.e., the tread force) is increased.

In the present embodiment, the first return spring 30' and the reaction force spring 50' are torsion springs and the movable member is the rotor (i.e., the first rotor 40') rotating around the swing axis line L1. In addition, hysteresis is not generated on the tread force characteristics not like the characteristics of FIGS. 6A and 6B. However, except for the above, the operation of the apparatus is substantially the same as the abovementioned embodiment. Therefore, the description thereof will not be repeated.

With the accelerator pedal apparatus according to the present embodiment, the reaction force adding mechanism (i.e., the first rotor 40', the reaction force spring 50', the lock member 70' and the actuator 80) opposed to the tread force to suppress excessive depression of the accelerator pedal 22 for improving fuel consumption and the like can be satisfied while achieving structural simplification, part number reduction, cost reduction, downsizing of the entire apparatus, and the like. Accordingly, quick response accelerator operation can be obtained.

In addition, since the rotor (i.e., the first rotor 40') rotating around the swing axis line L1 of the pedal arm 20' is adopted as the movable member and the torsion springs (i.e., the first return spring 30' and the reaction force spring 50') arranged around the swing axis line L1 are adopted as the first return spring and the reaction force spring, various parts can be aggregated at the vicinity of the swing axis line L1 and the apparatus can be downsized.

As described above, the accelerator pedal apparatus according to the present invention includes a reaction force adding mechanism being opposed to the tread force to suppress excessive depression for improving fuel consumption and the like while achieving structural simplification, part number reduction, cost reduction, downsizing of the entire apparatus, and the like. In addition, both of the reaction force adding mechanism and a hysteresis generating mechanism to generate hysteresis on the tread force can be satisfied. Accordingly, since the accelerator pedal apparatus having quick response can be obtained, the present invention is useful not only for automobiles but also for motorcycles, other vehicles and the like.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An accelerator pedal apparatus comprising:
   a pedal arm which includes an accelerator pedal;
   a housing which supports the pedal arm between a rest position and a maximum depression position as being rotatable around a predetermined swing axis line;
   a first return spring which exerts urging force to the pedal arm to return toward the rest position; and
   a reaction force adding mechanism which adds reaction force opposed to tread force of the accelerator pedal,
   wherein the housing includes a receiving portion receiving one end part of the first return spring and a concave portion,
   wherein the reaction force adding mechanism includes a movable member movably arranged against the concave portion of the housing while receiving reaction force of the first return spring, a reaction force spring arranged between the movable member and the pedal arm to be capable of generating reaction force against the tread force, and a lock mechanism capable of locking the movable member not to be movable at desired timing,
   wherein the lock mechanism includes a lock member having a curved face portion having a predetermined convex curvature formed between two flat face portions, a rotation shaft which is connected to the lock member, and an actuator rotationally driving the rotational shaft, the lock member being configured to lock the movable member by the curved face portion pressing on the movable member,
   wherein the movable member includes an end face wall and an outer wall face, the end face wall being engaged with an other end part of the first return spring, and the outer wall face being configured to be contacted by the lock member and pressed to a slide face which is defined by the concave portion of the housing, and
   wherein the lock member provides a one-way lock function that is configured to form a locked state of the movable member by the outer wall face of the movable member pressing on the slide face when the lock member rotates in one direction by the actuator and releases the locked state when the lock member rotates in the other direction as following movement of the movable member due to return force of the first return spring.

2. The accelerator pedal apparatus according to claim 1, further comprising:
   a hysteresis generating mechanism which generates hysteresis on tread force of the accelerator pedal,
   wherein the movable member is constituted with a slider formed to be cylindrical having an inner wall face and arranged slidably in a predetermined direction against the housing,
   the first return spring and the reaction force spring are constituted respectively with a compression spring to be stretched and compressed in the predetermined direction,
   the reaction force spring is arranged at the inside of the slider, and
   the hysteresis generating mechanism includes an inner slider slidably arranged within the slider and between the pedal arm and the reaction force spring having sliding resistance force increased in accordance with increase of the tread force.

3. The accelerator pedal apparatus according to claim 2, further comprising:
   a second return spring which exerts urging force to the pedal arm as being directly engaged therewith so as to return the pedal arm toward the rest position,
   wherein the pedal arm is engaged with the inner slider as being possible to be disengaged therefrom.

* * * * *